(12) United States Patent
Burrow

(10) Patent No.: US 10,490,934 B2
(45) Date of Patent: Nov. 26, 2019

(54) CABLE CONNECTION AND METHOD

(71) Applicant: Siemens Aktiengesellschaft, Munich (DE)

(72) Inventor: Christopher Burrow, Ulverston (GB)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/101,721

(22) Filed: Aug. 13, 2018

(65) Prior Publication Data
US 2019/0074630 A1 Mar. 7, 2019

(30) Foreign Application Priority Data
Sep. 1, 2017 (GB) .................................. 1714040.1

(51) Int. Cl.
*H01R 4/38* (2006.01)
*H01R 13/622* (2006.01)
*H01R 13/631* (2006.01)
*H01R 13/641* (2006.01)
*H01R 43/26* (2006.01)
*H01R 4/26* (2006.01)
(Continued)

(52) U.S. Cl.
CPC ............ *H01R 13/622* (2013.01); *H01R 4/26* (2013.01); *H01R 4/5025* (2013.01); *H01R 13/523* (2013.01); *H01R 13/631* (2013.01); *H01R 13/641* (2013.01); *H01R 43/26* (2013.01); *H01R 43/28* (2013.01); *H02G 15/14* (2013.01); *H01R 13/59* (2013.01); *H02G 15/007* (2013.01)

(58) Field of Classification Search
CPC .......................... H01R 4/5025; H01R 4/5033

USPC .................................................. 439/805, 428
See application file for complete search history.

(56) References Cited

U.S. PATENT DOCUMENTS 1,039,542 A    9/1912 Kennington
1,856,018 A *  4/1932 Barth .................. H01R 4/5033
                                                439/428
(Continued)

FOREIGN PATENT DOCUMENTS

GB              705831 A       3/1954

OTHER PUBLICATIONS

GB search report dated Mar. 2, 2018, for GB patent application No. 1714040.1.

*Primary Examiner* — Neil Abrams
(74) *Attorney, Agent, or Firm* — Beusse Wolter Sanks & Maire

(57) ABSTRACT

A subsea connector cable connection system has an interface and a retainer. One of the interface and the retainer has an external screw thread on a cylindrical section and the other has a corresponding internal screw thread on a cylindrical section. The interface further includes a conical body extending from the cylindrical section and the retainer further includes a corresponding conical internal surface extending from the cylindrical section and adapted to be spaced from the surface of the conical body when the interface and retainer are screwed together. Interaction of the conical body and conical internal surface produces a first end stop adapted to stop axial movement of the retainer. A second end stop remote from the first end stop is provided, adapted to stop axial movement of the cable.
In one embodiment the connector may include a locking mechanism whereby undoing the joint requires more torque than doing up the joint.

23 Claims, 9 Drawing Sheets

(51) Int. Cl.
  *H01R 4/50*    (2006.01)
  *H01R 13/523*  (2006.01)
  *H01R 43/28*   (2006.01)
  *H02G 15/14*   (2006.01)
  *H01R 13/59*   (2006.01)
  *H02G 15/007*  (2006.01)

(56) References Cited

U.S. PATENT DOCUMENTS

| | | | |
|---|---|---|---|
| 2,777,117 A | | 1/1957 | Shrider |
| 4,067,371 A | * | 1/1978 | Stencel ............... F16B 37/122 |
| | | | 411/107 |
| 5,100,348 A | * | 3/1992 | Herman ............... H01R 4/5025 |
| | | | 439/724 |
| 5,228,875 A | | 7/1993 | Swenson |
| 5,487,679 A | * | 1/1996 | Quaintance .......... H01R 4/5033 |
| | | | 24/136 B |
| 6,644,998 B2 | * | 11/2003 | Kaufmann ........... H01R 4/2487 |
| | | | 439/412 |
| 6,695,653 B1 | * | 2/2004 | Tomasino ............ H01R 4/5033 |
| | | | 439/428 |
| 7,261,506 B2 | * | 8/2007 | Smolarek ............... F16B 39/24 |
| | | | 411/114 |
| 7,311,565 B2 | | 12/2007 | Fankhauser et al. |
| 8,894,434 B2 | * | 11/2014 | Feye-Hohmann ... H01R 4/5033 |
| | | | 439/427 |
| 9,752,611 B2 | * | 9/2017 | Smith ..................... F16B 39/24 |
| 10,128,615 B2 | * | 11/2018 | Thomas ................. H01R 11/12 |
| 2019/0074630 A1 | * | 3/2019 | Burrow ................ H01R 13/622 |

\* cited by examiner

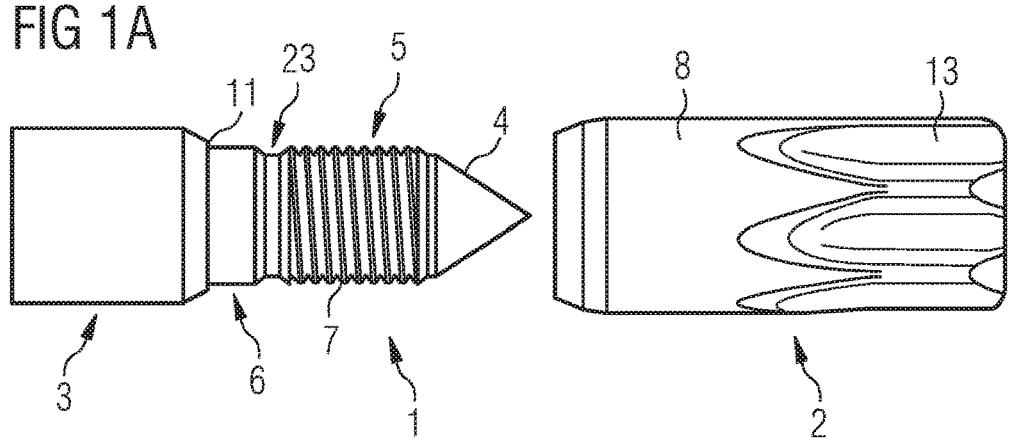
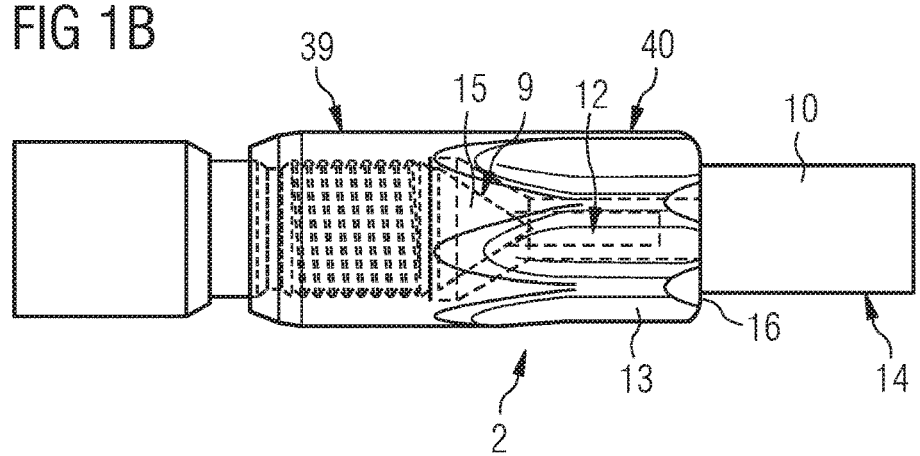
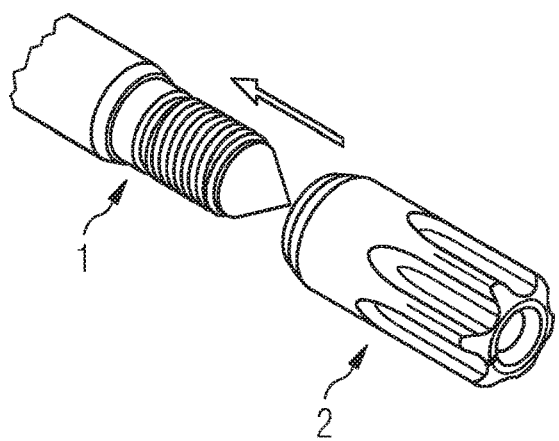
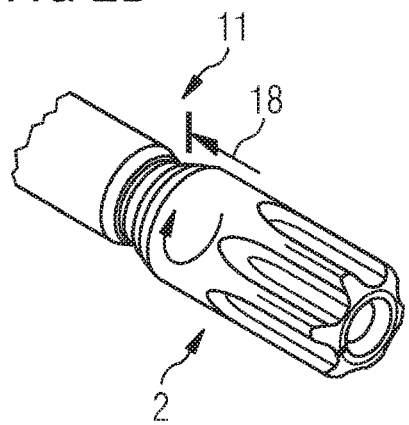

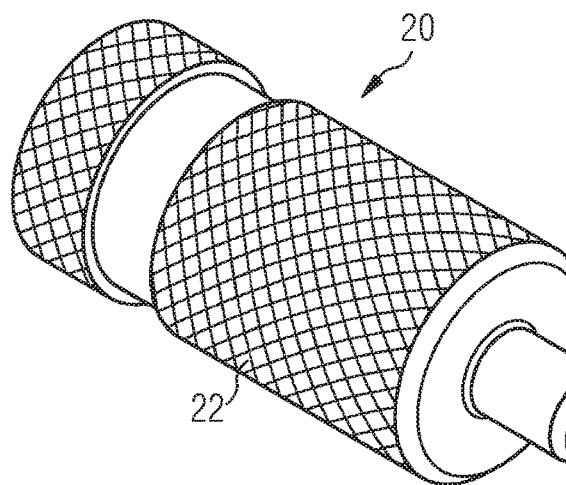
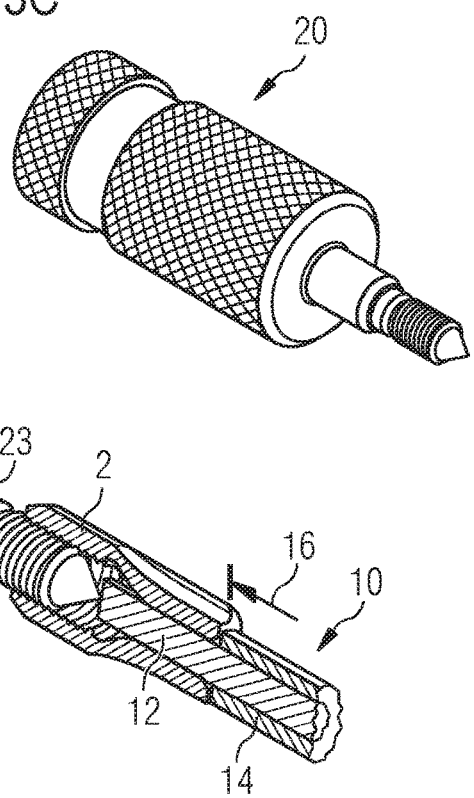
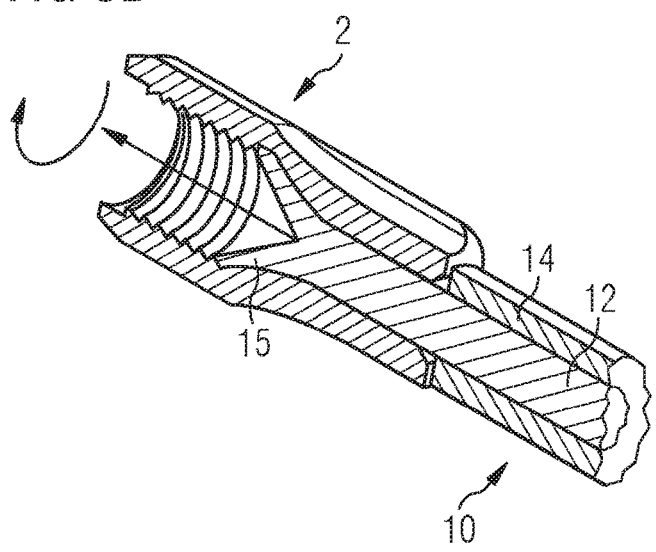

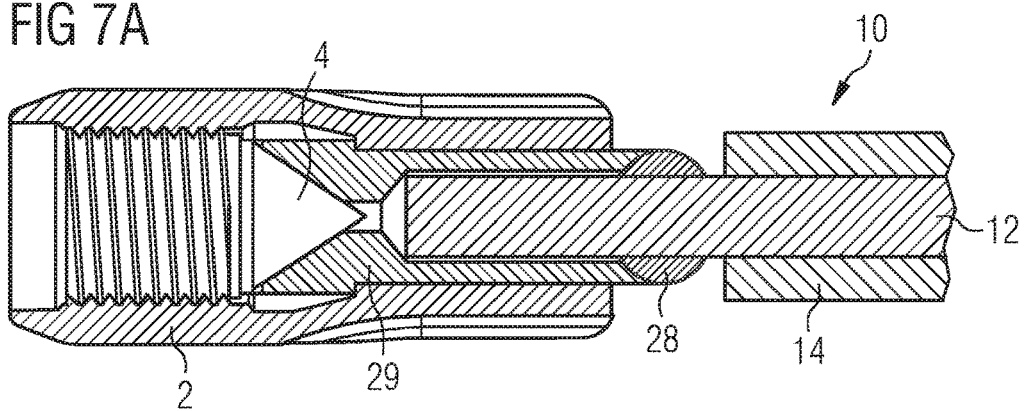
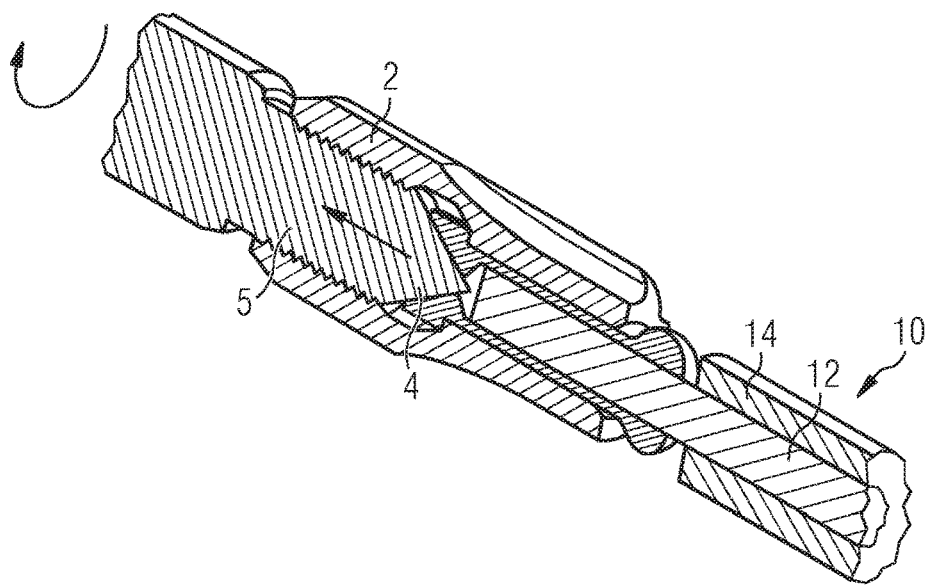
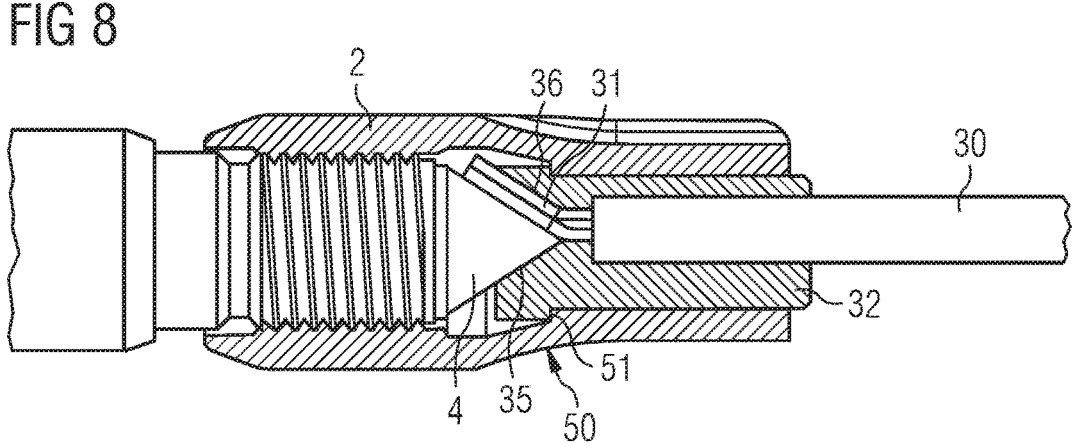

FIG 9
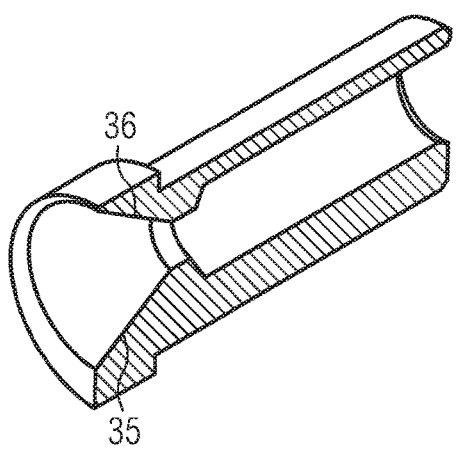
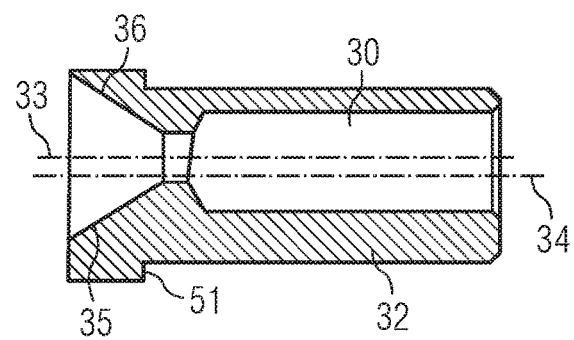
FIG 10A
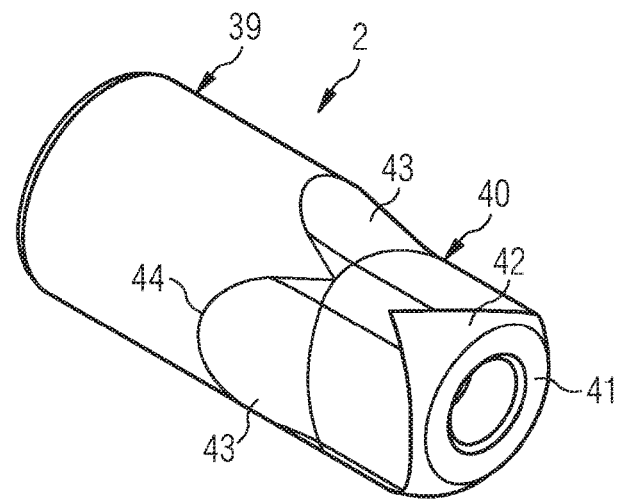
FIG 10B
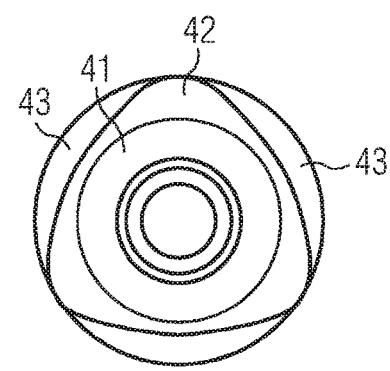

CABLE CONNECTION AND METHOD

CROSS REFERENCE TO RELATED APPLICATIONS

This application claims the benefit of United Kingdom Application No. GB 1714040.1 filed 1 Sep. 2017, incorporated by reference herein in its entirety.

FIELD OF INVENTION

This invention relates to a cable clamp for a connector, in particular a subsea connector and a method of connecting a cable to a connector.

BACKGROUND OF INVENTION

In subsea connectors one of the critical regions is the termination of the subsea cable to the connector in a cable gland. To ensure a reliable connection to the cable, it is important that the cable is held in place correctly and with minimal electrical resistance. Furthermore it is important that any external pulling or twisting forces acting on the cable cannot cause the cable to move, or to be pulled out of the gland.

Difficulties with clamping the cable result from the general construction of the cables. Cables often comprise a metallic core, typically copper, with several layers of rubber, plastic and metal to form the cable insulation, earth screen and protective outer jacket. The metallic core must be fitted to the connector in the cable gland such that there is both an effective electrical connection to allow proper operation of the cable and an effective mechanical connection to prevent the cable parting from the connector. For controls and instrumentation type connectors, this typically involves soldering the cable core to the connector, meaning that manufacturing the connections is a skilled and time consuming operation. Soldered joints are difficult to make within the confines of the backends of control connectors because the interface is densely packed and deeply recessed. Cables add obstruction and clutter and joint making requires considerable operator skill to attain quality and repeatability. It is also desirable that the joint produced can be recycled and achieving this is another highly skilled task. Furthermore, there are health and safety concerns associated with manufacturing soldered joints and problems with contamination due to the flux removal process. One option to avoid soldering is to use a crimp type cable joint.

U.S. Pat. No. 7,311,565 addresses the desire for a cable connection system which has good electrical and mechanical properties by providing a viewing window to enable a check to be made that the cable connector has been inserted sufficiently far, as well as a marker recess located on the body of a clamping cone away from the cable, so that a clamping sleeve can be screwed up to the correct extent.

SUMMARY OF INVENTION

In accordance with a first aspect of the present invention, a subsea connector cable connection system comprises an interface; and a retainer; wherein one of the interface and the retainer comprises an external screw thread on a cylindrical section and the other comprises a corresponding internal screw thread on a cylindrical section; the interface further comprising a conical body extending from the cylindrical section and the retainer further comprising a corresponding conical internal surface extending from the cylindrical section and adapted to be spaced from the surface of the conical body when the interface and retainer are screwed together; wherein interaction of the conical body and conical internal surface produces a first end stop adapted to stop axial movement of the retainer; and wherein the system comprises a second end stop remote from the first end stop, adapted to stop axial movement of the cable.

The present invention provides a cable clamp for connecting a cable to a subsea connector, in particular a controls-style subsea connector which enables an alternative method of connecting the cable to the connector. The functional end stop is created by the conical body, which has a male cone shape interacting with the conical internal surface having a female cone shape acts to locate the parts of the joint relative to one another.

Preferably, the retainer further comprises an indicator at the end of the retainer, remote from the first end stop.

The indicator enables a space formed between the conical body of the interface and the corresponding conical inner surface of the retainer to be sufficient to allow a conductor of a cable to fit between the body and retainer surfaces and be held in mechanical and electrical contact with the conical body of the interface and the indictor, without complex construction steps.

Preferably, the interface of the connection system comprises a copy of an interface in a connector to which the cable is to be connected.

Preferably, the interface of the connection system is mounted to a removable former.

Preferably, the system further comprises a removable storage mount; wherein the interface is integral with the storage mount.

The cable conductor of the cable may comprise stranded wire.

Preferably, the second end stop comprises the end of the retainer remote from the screw thread cylindrical section.

The cable conductor may comprise a single solid or hollow conductor.

Preferably, the second end stop comprises a recessed, or counter, bore in the end of the retainer which receives the cable.

Preferably, the second end stop is incorporated into a single conductor cable adapter having a centreline offset from a centreline of the cable.

Preferably, the single conductor cable adapter comprises a conical inner surface, the centreline of which is offset from the centreline of the retainer.

This ensures that the conductor of the single conductor cable is firmly held in place by the contact of the inner conical surface of the adapter with the conductor and with the conical body of the interface.

Preferably, the connection system further comprises a locking mechanism whereby undoing the joint requires more torque than doing up the joint.

Preferably, the locking mechanism is mounted in one of the internal screw thread, the external screw thread, or a groove in the interface.

Preferably, the locking mechanism comprises one of a resilient open ring, circlip, or spring.

Preferably, the locking mechanism further comprises an anchor to anchor one end of the locking mechanism in place.

In accordance with a second aspect of the present invention, a method of connecting an electrical conductor of a cable to a retainer of a connector of a subsea cable connection system according to the first aspect, the method comprising fitting the retainer to the interface until the first end stop is produced; moving the retainer away from the first end stop by a predetermined distance, determined using the indicator on the retainer; and inserting a conductor of a cable into the space formed between the surfaces of the interface and retainer until the cable comes into contact with the second end stop.

The method adds flexibility to the joint making process whilst de-skilling and improving recyclability of joints and connectors.

In accordance with a third aspect of the present invention, a method of connecting an electrical conductor of a cable to the retainer of a connector of a subsea cable connection system according to the first aspect, the method comprising fitting a conductor of a cable to the retainer by inserting the conductor into one end of the retainer until the cable comes into contact with a second end stop, inserting a copy of the interface of the connector to which the retainer is to be fitted in order to join the cable and retainer; and removing the copy of the interface before coupling the joined cable and retainer to the interface of the connector.

Preferably, the method further comprises using the interface mounted to a former and removing the former and interface after inserting the cable conductor.

This allows a retainer and cable to be pre-formed for assembly at a later stage, reducing complexity in the assembly process and permitting visual quality inspection before completing assembly of the connector.

Preferably, the method further comprises inserting the removable storage mount in place of the interface on the former after removing the former and the interface.

This allows a preformed retainer and cable to be stored safely until required. In another embodiment, the removable storage mount may also be used to pre-form the retainer to cable connection and simply left in place until the pre-formed part is required.

Preferably, the method further comprises tightening the retainer to hold the conductor in electrical and mechanical contact with the interface.

Preferably, the method further comprises applying a solder layer between the second end stop and the conductor.

Preferably, the method further comprises applying solder between the conductor and the retainer.

Preferably, the method further comprises applying the locking mechanism to the interface, or the retainer before forming the joint.

BRIEF DESCRIPTION OF THE DRAWINGS

An example of a cable connection and associated method in accordance with the present invention will now be described with reference to the accompanying drawings in which:

FIG. 1A illustrates an overview of a joint of a first example of a connection according to the invention, when separated;

FIG. 1B illustrates an overview of the joint of FIG. 1A, when connected;

FIGS. 2A to 2F illustrate a primary joint making sequence for the example of a connection according to the present invention of FIGS. 1A and 1B;

FIGS. 3A-3C illustrate an alternative example of a joint preparation sequence, for a connection according to the present invention;

FIGS. 7A and 7B illustrate another variant of a connection according to the present invention;

FIG. 8 illustrates a conical interface adapted for a solid conductor cable for a connection according to the present invention;

FIG. 9 illustrates an adaptor for a single conductor cable for use with a connection according to the present invention;

FIGS. 10A and 10B illustrate a trilobe retainer for use in assembly of a connection according to the present invention;

DETAILED DESCRIPTION OF INVENTION

Figure 2C:
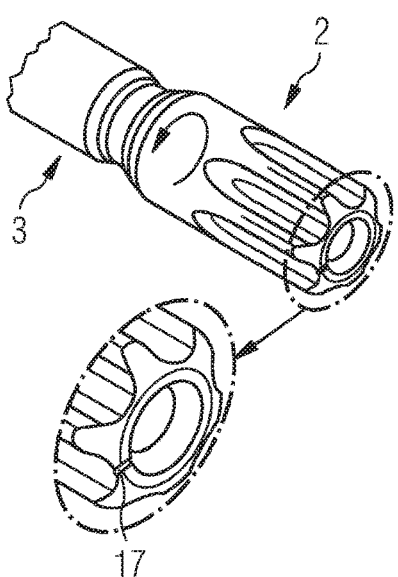
Figure 2D:
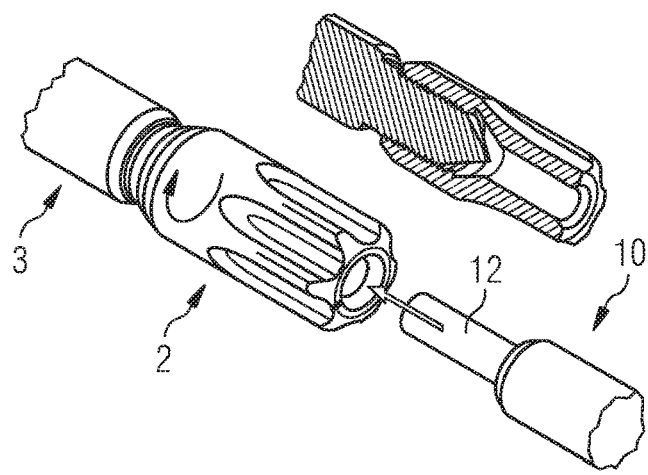

For subsea applications, it is important that a reliable electrical connection is made between the cable and the connector in the cable gland, so that the connector is able to withstand the forces applied due to the water pressure at depth, or rough handling during installation or maintenance, whilst facilitating low electrical resistance. Further improvements are desirable. The present invention provides a number of embodiments which simplify both the structure of the connector and the assembly process.

In a first example, illustrated in FIGS. 1A and 1B, a joint for a subsea connector is illustrated. FIG. 1A shows the parts before they are connected. A joint is formed by an interface 1 and a retainer 2. The interface as illustrated is mounted to a support 3 and comprises a conical body 4 at one end of the interface, a substantially cylindrical section 5 and optionally, a shaped section with a groove 23 at the end of the cylindrical section remote from the conical body 4. The support 3 may be removable, as described in more detail with respect to the later examples, or may be part of a pin of a connector body to which a cable is being joined. In this example, the pin 6 is shown, with insulation 11 partially covering the pin. The retainer 2 comprises a hollow cylindrical housing 8, one end 40 of which may be provided indentations 13, illustrated here as a hexalobe form, to enable the retainer to be manipulated, typically with a compatible tool. As can be seen more easily in FIG. 1B, the retainer 2 may be provided with an inner surface shaped to be substantially cylindrical in the section 39, which covers the cylindrical section 5 of the interface, when fitted and a tapered, substantially conical section 9, a female cone, which corresponds to the shape of the conical body 4, a male cone, of the interface, when fitted, forming a conical clamp for a cable 10. In the example shown, it can be seen that the remainder of the inner surface of the retainer is substantially cylindrical at the end closest to the cable. A functional end stop is given by clamping action of the conductor between the male and female cones, so this part works with float to accommodate tolerance variation in the parts involved.

Both the interface section 5 and the retainer section 8 are provided with a screw thread 7 on their outer and inner surfaces respectively, male or female on one surface and a corresponding female or male screw thread 7 on the other surface. Preferably, the screw thread is chosen to be consistently male or female for interface or retainer, so that such parts are universal for all connectors. The cable 10 as shown, has had its insulation 14 striped off at the end nearest the joint, exposing the conductor 12. At the end 15 of the conductor 12, where it comes into contact with the conical body 4, the conductor, which may be a stranded wire conductor, has been spread out over the surface of the conical body 4. The tapered substantially conical section 9 of the retainer and the conical body 4 compress and hold the conductor clamped between them. At the end of the retainer remote from the interface, an outer surface acts as an end stop 16 for the insulation of the cable which has not been stripped. By appropriate measurement of the amount of insulation to remove when stripping the cable before insertion, the conductor length within the retainer/interface joint may be controlled. The choice of retainer length and internal diameter may be matched to the cable size for ease of fitting.

Figure 2E:
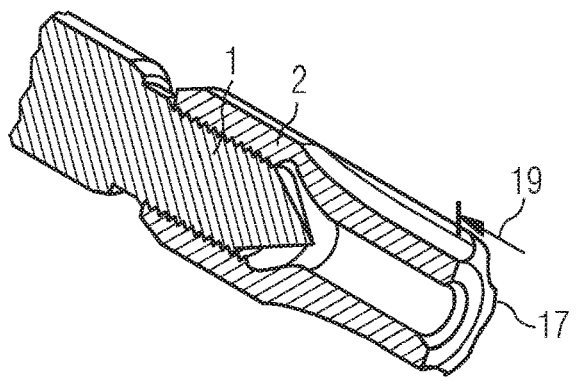
Figure 2F:
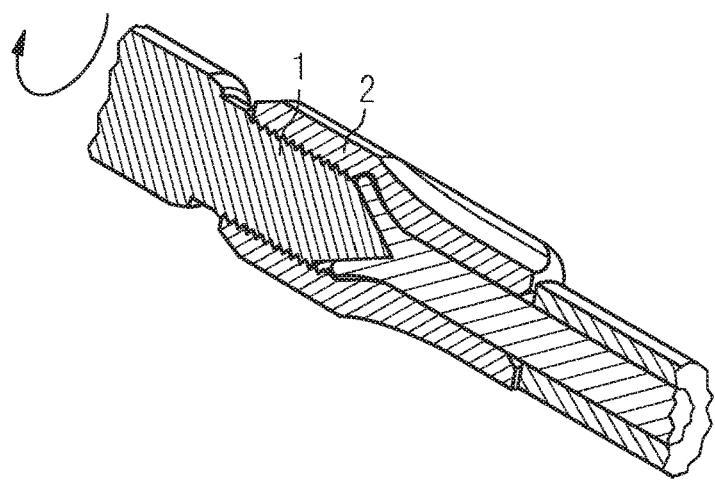
Figure 4:
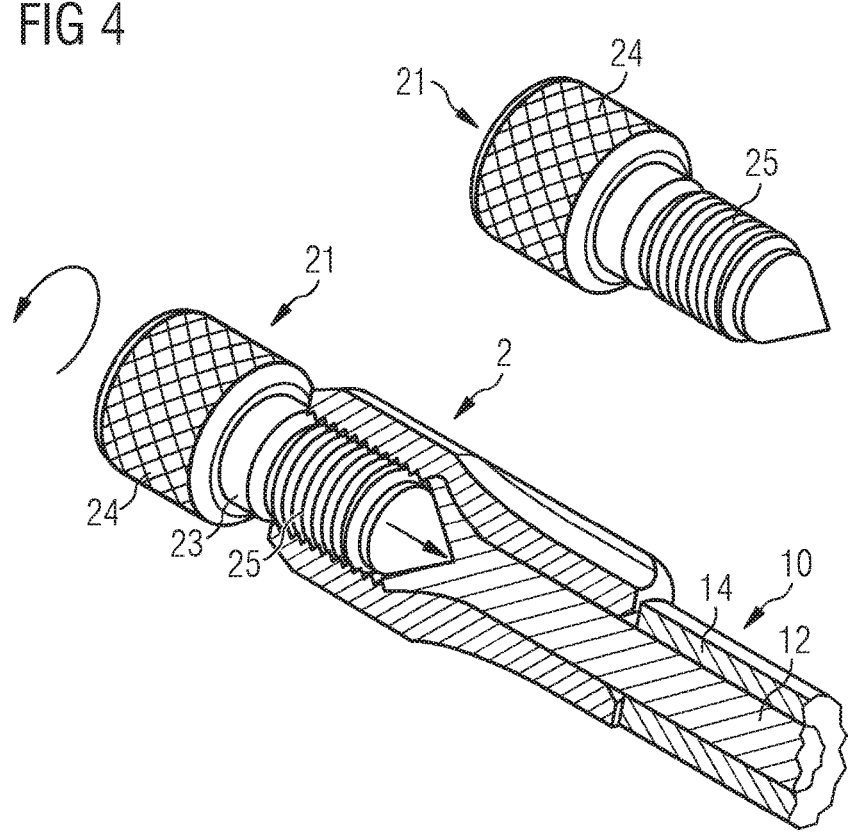
FIG. 4 illustrates a component for protecting a joint made according to the sequence of FIG. 3A-3C.

Assembly of the joint is illustrated in FIGS. 2A to 2F. The first stage, in FIG. 2A, is to locate the retainer 2 over the interface 1. When the screw threads 13 come into contact, the retainer is screwed onto the interface (FIG. 2B), until the female cone of the retainer comes up against the male cone of the pin. The extent to which the retainer covers the interface is indicated by line 18. The retainer is provided with an indicator line 17 on the end remote from the interface (FIG. 2C) which allows the retainer to be backed off from the end stop by a predetermined number of turns. This allows the conductor 12 of the cable 10, from which the insulation 14 has been stripped off, to be inserted into the open end of the retainer 2 (FIG. 2D) and forced down over the cone until the cable insulation 14 bottoms out on the end stop 17 of the retainer, as indicated by line 19 (FIG. 2E). The retainer is then screwed back up towards the first location 11 to clamp the cable end 15 between the two conical surfaces of the joint (FIG. 2F).

An improvement to the method of carrying out the assembly process is to use a separate former 20 to fit the cable into the retainer, rather than using the interface 1 itself to form that part of the connector. This aspect is illustrated in FIGS. 3A-3C and 4. Instead of fitting the retainer 2 over the interface 1, as in FIGS. 2A to 2C, the process starts by inserting the conductor of a stripped section of the cable 12 into the open end of the retainer, until the cable insulation 14 of the unstripped section of cable comes into contact with the end stop 16 on the retainer 2 and the conductor 12 is located at the correct position relative to the tapered conical surface inside the retainer. A tool 20 (FIG. 3C) comprising a copy 25 of the interface on a former 22, which may be a manually operable tool, is screwed into the opposite end of the retainer to the end into which the cable has been inserted, until resistance is felt from the gripping action of the male and female cones on the cable conductor (analogous to the retainer hitting an end stop at the end of the groove 23 on the former (FIG. 3A). At this point, an end has been formed from the retainer and cable and the forming tool 20 is removed (FIG. 3B). The pre-formed, coned, cable end 15 within the retainer may now be visually inspected for quality before the joint is closed permanently into the back of a connector by screwing it onto the interface 5 of the connection. This visual check step provides further confidence in the overall robustness of each assembled connection without resorting to more expensive and time consuming verification methods, such as CT or X-ray scans to verify the soldered terminations by enabling an assessment of the correct length and distribution of conductor strands. In addition, the method described avoids the need for counting turns to back off, using the indicator line on the retainer, as is required in the method of FIGS. 2A to 2F, further simplifying the assembly process. The screw threads on the interface and the retainer are chosen with proportions such that the screw threads engage before the male cone point strikes the conductor, in order that the male cone point is correctly centred relative to the conductor and to stabilise the male cone point. The conductor is stabilised by its fit in the screw retainer drilled hole.

In order to protect the formed joint of the cable and retainer, a protective component 21 comprising a copy 25 of the interface on a mount 24 may be inserted after the visual check has been made and the formed joint is stored in this way, until required for assembly to a connector. Additionally, if an existing joint is dismantled and requires rework, the same component 21 may be used to preserve the joint and avoid the need for cutting back the cable 10 further, in order to remake the joint. In another variant, the protective component 21 may also act as the forming tool and be left in place once the retainer and cable have been screwed on. The visual check may be carried out before each formed joint is stored, by removing and replacing the former/protective component 21, or the visual check may be carried out at a later stage, but prior to assembly onto the interface 5 in the connector.

Figure 5:
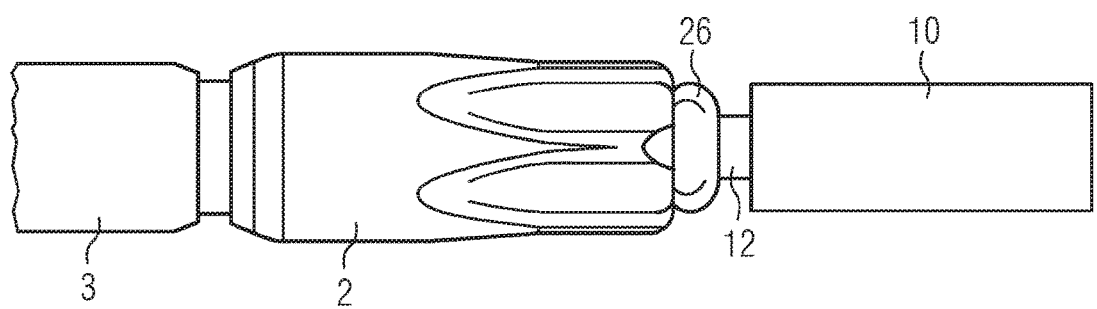
FIG. 5 illustrates a variation in the joint making sequence, applied to a connection according to the present invention.
Figure 6:
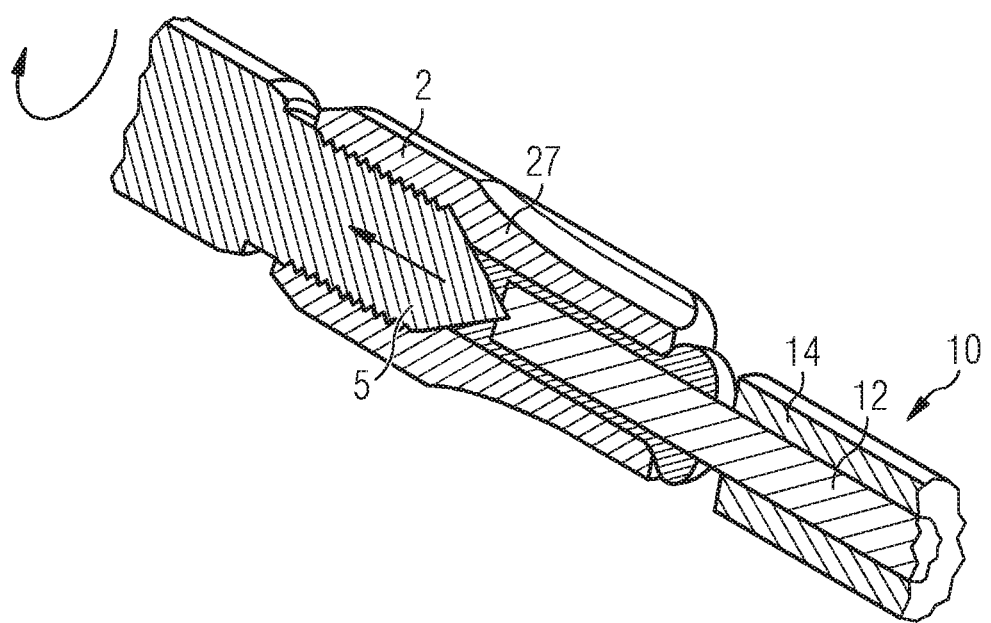
FIG. 6 shows a section through a direct soldered joint for a connection of the type shown in FIG. 5.

In addition to forming the retainer and cable joint by one of the methods described above, the improvement of the present invention may be augmented by soldering the retainer and cable conductor together in order to provide a robust, yet flexible connection. This is particularly applicable in cases where, for example, the conductor has too few strands, has an unfavourable distribution of strands, or too small a cross section (gauge) to form satisfactorily. An example of soldering the joint so formed is illustrated in FIGS. 5 and 6. Instead of trying to solder the conductor ends where the interface 5 and cable conductor end 15 meet, the mechanical and electrical contact is provided by the conical cable clamp of the joint formed as described above, but additional security is provided by applying solder 26 directly at the junction of the cable conductor 12 and the retainer 2 at the cable end 13. In this case, the insulation of the cable is cut back further after the initial formation, to leave space for the solder 26 to be applied. FIG. 6 illustrates the joint formed with the conical cable clamp as described above showing the solder 27 within the retainer 2.

Although a soldered joining method has problems, some of the disadvantages may be overcome if the soldering is performed outside the confines of a connector backend. An example of this is shown in FIGS. 7A and 7B, where a sub-assembly is formed. A ferrule 29 facilitates a soldered joint decoupled from the pin (the male cone) and screw thread and with the benefit of being made outside the confines of a connector backend. When the soldered connection is brought into electrical contact with the pin, it has the benefit that it is possible to screw the connection and pin together without twisting the cable to accommodate the screw action of the thread. Low electrical resistance is still achieved in the combination of a soldered connection and a cone clamp connection whilst allowing the joint to be dismantled and reassembled frequently. By contrast, the conventional direct solder method solders the conductor in a fashion that cannot be dismantled without de-soldering (with the incumbent disadvantages). The sub assembly is mechanically attached to the pin after soldering (i.e., by the thread) and so has the advantage of further disassembly and re-assembly without degradation. The soldering may be done in such a way that dismantling is possible and the joint can be reused, which is useful when repairing, or replacing parts. The method of FIG. 7A-7B facilitates indirect soldering and recycling, whilst decoupling the cable from the fastening action of the screw thread by not carrying out the steps in the confines of the back of a connector, as is required in conventional methods.

Another variant is proposed for the situation where a cable having a single solid conductor, such as an Ethernet cable, needs to be connected. Unlike the stranded, or filament, type of conductor, the solid conductor will take up a location on only one side of the conical clamp formed between the conical body 4 of the interface 1. Retainer 2 has a perpendicular load shoulder 50 that makes contact with a similar load shoulder 51 on the cable adaptor 32 to impart the clamping effect of operating the screw thread between the conductor pin and screw retainer. In order to make the grip more reliable when clamped in this way, the example of FIG. 8 illustrates how a single conductor cable adaptor 32 may be used. Instead of the cable conductor 31 being coaxial with the interface 1 and retainer 2 and able to contact any part of the conical surfaces when inserted into the retainer opening, the axis 33 adapter 32 is offset, as can be seen in FIG. 9 and provided with an offset opening to support the single cable 30. In a tapered cone 35 at the base of the adapter 32, a section 36 is presented to receive the single conductor 31. This is achieved by virtue of offsetting the axis of the cone to locate the single conductor as required. Thus, the single conductor cable is forced into an offset position with respect to the axis 34 of the interface and retainer and the end of the conductor goes into the section 36, rather than being free to move around the conical surface.

The clamping is between the conductor 31 and the surface 36 of the adaptor in a fixed location and over the remaining surface of the conical body 4, there is direct contact between a tapered inner surface 35 of the adaptor and the outer surface of the conical body 4. This provides a more reliable grip between the parts. This can be seen in FIG. 9 which shows the axis of the adaptor 33, as well as the centreline axis 34 of the retainer. The effect of the offset is that the female cone, i.e. the inner conical surface of the adaptor, is offset from the main centreline and the male cone, i.e. the outer conical surface of the conical body 4. This gives direct contact between the male and female cones over part of the surface and contact through the conductor 31 over the where the conductor is present.

The retainer 2 may take various forms. The examples described above use a hexalobe form, for the cable end 40 of the retainer 2, which is compatible with a hexalobe tool for tightening the retainer. The tool has an open-socket geometry to allow the cable to pass through, for easy tool removal. However, other forms of retainer geometry may be substituted, such as pentalobe, or trilobe. Typically, increasing the number of lobes enables an increase in the torque transfer from the tool to the retainer, but the increased complexity of the shape makes obtaining a seal over the surface which is free of air pockets more difficult.

Figure 11:
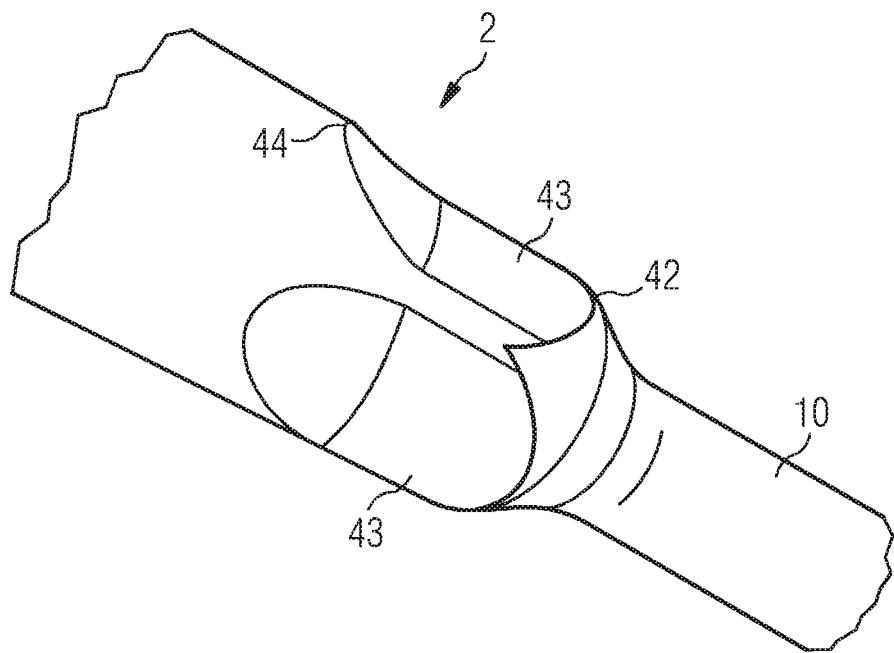
FIG. 11 illustrates an example of a trilobe retainer with a termination sleeve fitted.

A trilobe profile as illustrated in FIGS. 10A and 10B has an external geometry much better suited to covering with the elastomeric termination sleeve typically used in subsea electrical connections, because its geometry comprises a series of convex curves meeting with tangency and no undercuts exist. As before, the retainer 2 comprises a substantially cylindrical first section 39 and a second section 40 with indentations. For the trilobe design, a ring shaped end piece 41 provides an opening into which the cable 10 may be inserted. Curved surfaces 42 define one end of the indentations 43 on the second section of the retainer and curves 44 indicate where the indentations run into the substantially cylindrical first section of the retainer. Thus, a trilobe retainer allows a compliant termination sleeve to be made to fit without the use of matching internal geometry, relying entirely on stretch, i.e. the elastomeric term. (termination) sleeve inner diameter being slightly smaller than the screw retainer outer diameter/s to ensure a good fit, free from air pockets which otherwise typically lead to raised electrical stresses in high tension systems. This can be seen in the example of FIG. 11 showing the termination sleeve, in this case black tubing, that has been shrink-fitted onto the conforming trilobe profile, without air entrapment at the interface.

Figure 12:
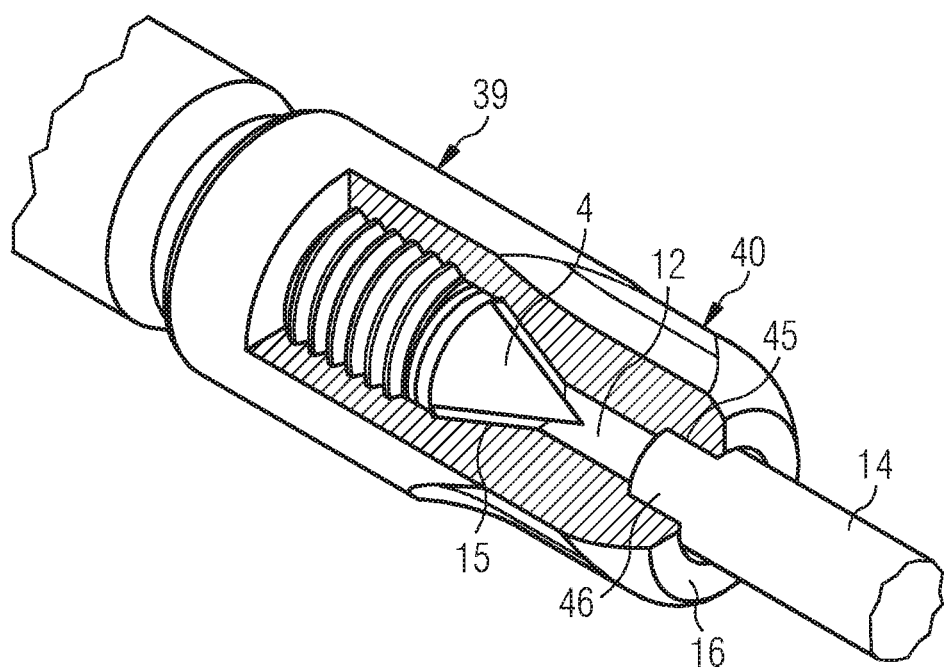
FIG. 12 illustrates a retainer with a recess for the cable, for use in a connection according to the present invention; and, FIGS. 13A, 13B and 13C illustrate aspects of a locking mechanism for use with a connection according to the present invention.

Another modification to the design of the screw retainer is that rather than arranging for the end face of the stripped cable insulation 14 of the cable 10 to abut the screw retainer end face 16, for example, as in FIG. 1B, a counter bore, or recessed bore may be provided in the end of the screw retainer 2 to receive the cable insulation 14, as well as the cable conductor. This helps with cable exit stress management, reducing stress on the cable at this point, in particular bending stress. This is particularly beneficial for smaller cable sizes. This is illustrated in FIG. 12. Counter bore 45 in the end of the second section 40 of the retainer 2 receives an end part 46 of the cable insulation 14. The conductor part 12 of the cable fits to the pin male cone, as previously described. By extending the insulation 14 into the retainer section 40, the insulation takes the stress, rather than the conductive core and reduces the amount of bending which can be applied across the end face 16.

Figure 13A:
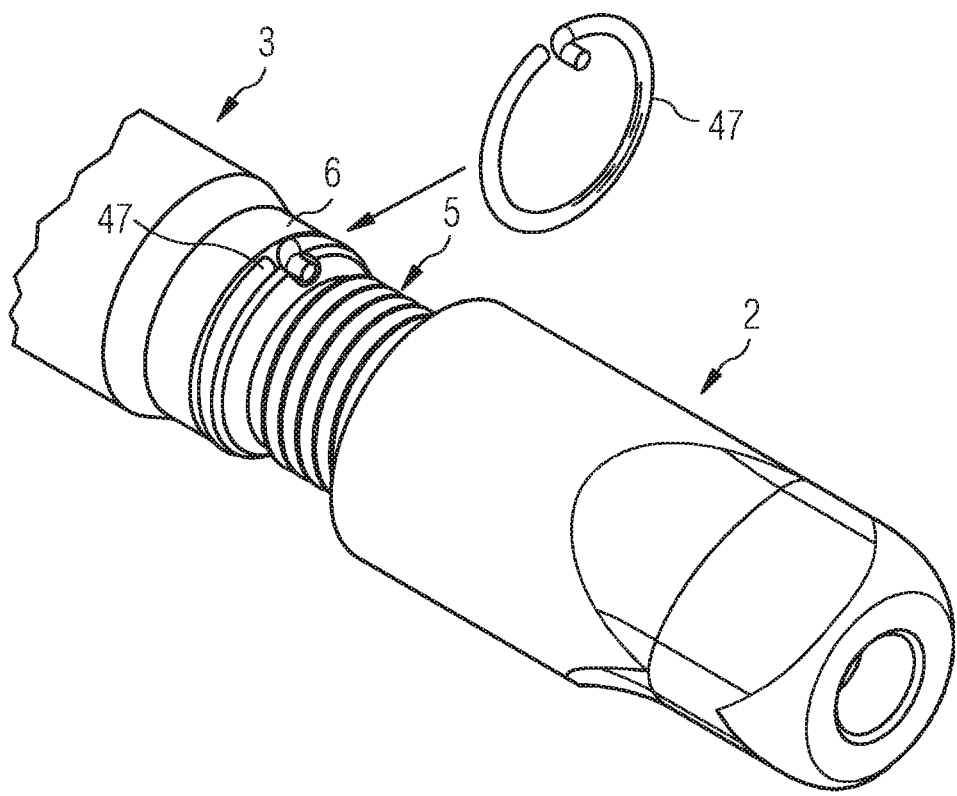
Figure 13B:
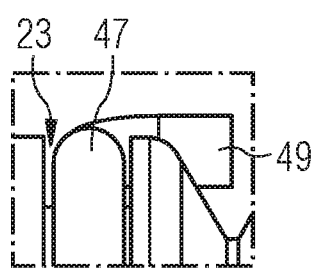
Figure 13C:
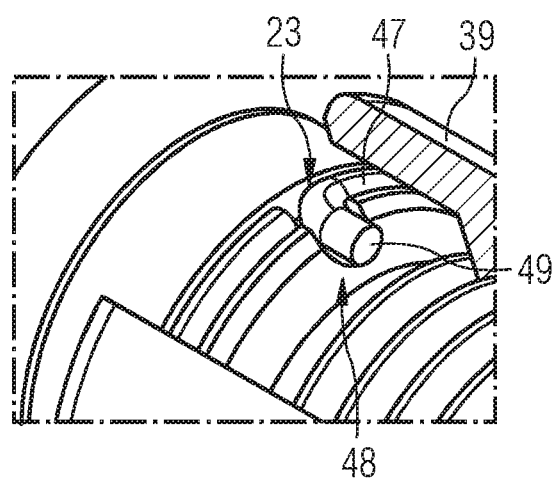

Although being able to apply a relatively low amount of torque to the retainer to form the joint is beneficial, it is necessary to ensure that the joint remains properly clamped and does not accidentally release. In order to achieve this, a locking mechanism is provided, which is effective until the undoing torque applied exceeds a predetermined amount, after which the lock ceases to have effect. This prevents accidental release, without adding unnecessary complication to the process of undoing the joint, or the ability to recycle the joint components. The locking mechanism may take the form of a resilient ring, open at the ends, so that its diameter is adaptable by the application or removal of pressure, for example a resilient open ring, circlip, or spring. As can be seen in FIG. 13A, illustrating the joint before the retainer is screwed on, an example of a suitable locking mechanism is a spring 47, located in the housing groove 23 of the conductor pin 6. The spring may be a clutch spring with one or more turns, shown in this example with a single turn. An end 49 of the clutch spring is anchored, for example in a notch 48 of the conductor pin, as shown in more detail in FIGS. 13B. FIG. 13C shows more detail of the joint with the retainer in place, cut away for clarity, The clutch spring 47 of this example has a slightly larger outside diameter than the inside diameter of the screw retainer 2. A small amount of friction is generated as the clutch spring 47 and retainer 2 are brought into contact during assembly, because the spring is compliant. As the spring is anchored at one end 49 to prevent it from rotating in the groove 23, when the screw retainer 2 is tightened onto the pin 6, the direction of rotation of the retainer 2 interacts with surface friction at the interface of the spring and retainer, causing the spring 47 to fractionally decrease in diameter facilitating assembly with negligible effect (i.e., negligible binding friction). When an attempt is made to undo the screw retainer 2, the spring 47 is caused to increase in diameter, because rotation of the retainer is effectively unwinding the spring, so substantially increasing the surface friction at the interface of the spring with the screw retainer.

By designing in a mismatch between the rate of increase in undoing torque and opposing frictional torque that exists at the interface, as the screw retainer is undone, at a given point the frictional torque becomes lower than undoing torque and the screw retainer slips over the clutch spring. The net effect is torque elevated beyond that of the undoing torque of the solderless joint alone Other variants of design may include using a spring having more than one turn, to increase the frictional torque, or using a spring anchored at the opposite end with left hand coiling, so there is less interference with a right hand screw thread during fitting. The cross section of the spring as illustrated is circular, but a non-circular cross section spring may also be used. To avoid the need for the groove in the pin 6, the spring may be chosen so that it nests in the screw thread instead. The anchor may be a notch in the screw thread of the pin, or a notch in the screw thread of the retainer, generating frictional torque from interaction between the internal diameter of the retainer and the conductor pin outer diameter. The locking mechanism described provides additional security with negligible effect on the torque required to do up the joint, or the electrical properties of the joint, in a simple and controllable manner.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims. Although the invention is illustrated and described in detail by the preferred embodiments, the invention is not limited by the examples disclosed, and other variations can be derived therefrom by a person skilled in the art without departing from the scope of the invention.

The invention claimed is:

1. A subsea connector cable connection system comprising:
    an interface; and
    a retainer;
    wherein one of the interface and the retainer comprises an external screw thread on a cylindrical section and the other comprises a corresponding internal screw thread on a cylindrical section;
    the interface further comprising a conical body extending from the cylindrical section and the retainer further comprising a corresponding conical internal surface extending from the cylindrical section and adapted to be spaced from a surface of the conical body when the interface and the retainer are screwed together;
    wherein interaction of the conical body and the corresponding conical internal surface produces a first end stop adapted to stop axial movement of the retainer;
    wherein the system comprises a second end stop remote from the first end stop, adapted to stop axial movement of a cable; and
    a locking mechanism whereby undoing the joint requires more torque than doing up the joint.

2. The system according to claim 1,
    wherein the retainer further comprises an indicator at an end of the retainer, remote from the first end stop.

3. The system according to claim 1,
    wherein the interface comprises a copy of an interface in a connector to which the cable is to be connected.

4. The system according to claim 3,
    wherein the interface is mounted to a removable former.

5. The system according to claim 1,
    wherein a cable conductor of the cable comprises stranded wire.

6. The system according to claim 1,
    wherein the second end stop comprises an end of the retainer remote from the screw thread cylindrical section.

7. The system according to claim 1,
    wherein a cable conductor of the cable comprises a single solid or hollow conductor.

8. The system according to claim 1,
    wherein the second end stop comprises a recessed, or counter, bore in an end of the retainer which receives the cable.

9. The system according to claim 1,
    wherein the second end stop is incorporated into a single conductor cable adapter comprising a centreline offset from a centreline of the cable.

10. The system according to claim 9,
    wherein the single conductor cable adapter comprises a conical inner surface, the centreline of which is offset from the centreline of the retainer.

11. The system according to claim 1,
    wherein the locking mechanism is mounted in one of the internal screw thread, the external screw thread, or a groove in the interface.

12. The system according to claim 1,
    wherein the locking mechanism comprises one of a resilient open ring, circlip, or spring.

13. The system according to claim 1,
    wherein the locking mechanism further comprises an anchor to anchor one end of the locking mechanism in place.

14. A method of connecting an electrical conductor of a cable to a retainer of a connector of a subsea cable connection system according to claim 1, the method comprising:
    fitting the retainer to the interface until the first end stop is produced;
    moving the retainer away from the first end stop by a predetermined distance, determined using an indicator on the retainer; and
    inserting a conductor of the cable into a space formed between the surfaces of the interface and the retainer until the cable comes into contact with the second end stop.

15. A method of connecting an electrical conductor of a cable to a retainer of a connector of a subsea cable connection system, wherein the subsea cable connection system comprises:
    an interface; and
    the retainer;
    wherein one of the interface and the retainer comprises an external screw thread on a cylindrical section and the other comprises a corresponding internal screw thread on a cylindrical section;
    the interface further comprising a conical body extending from the cylindrical section and the retainer further comprising a corresponding conical internal surface extending from the cylindrical section and adapted to be spaced from a surface of the conical body when the interface and the retainer are screwed together;
    wherein interaction of the conical body and the corresponding conical internal surface produces a first end stop adapted to stop axial movement of the retainer; and
    wherein the system comprises a second end stop remote from the first end stop, adapted to stop axial movement of the cable;

the method comprising:

fitting a conductor of the cable to the retainer by inserting the conductor into one end of the retainer until the cable comes into contact with the second end stop, inserting a copy of the interface of the connector to which the retainer is to be fitted in order to join the cable and the retainer; and removing the copy of the interface before coupling the joined cable and the retainer to the interface of the connector.

16. The method according to claim 15, further comprising:

a removeable former, wherein the interface is mounted to the removeable former; and using the interface mounted to the removeable former and removing the removeable former and interface after inserting the conductor of the cable.

17. The method according to claim 15, further comprising:

inserting a removable storage mount in place of the interface on the former after removing the former and interface.

18. The method according to claim 15, further comprising:

tightening the retainer to hold the conductor in electrical and mechanical contact with the interface.

19. The method according to claim 15, further comprising:

applying a solder layer between the second end stop and the conductor.

20. The method according to claim 19, further comprising:

applying solder between the conductor and the retainer.

21. The method according to claim 15, further comprising:

applying a locking mechanism to the interface, or the retainer before forming the joint.

22. A subsea connector cable connection system comprising:

an interface; and a retainer;

wherein one of the interface and the retainer comprises an external screw thread on a cylindrical section and the other comprises a corresponding internal screw thread on a cylindrical section;

the interface further comprising a conical body extending from the cylindrical section and the retainer further comprising a corresponding conical internal surface extending from the cylindrical section and adapted to be spaced from a surface of the conical body when the interface and the retainer are screwed together;

wherein interaction of the conical body and the corresponding conical internal surface produces a first end stop adapted to stop axial movement of the retainer;

wherein the system comprises a second end stop remote from the first end stop, adapted to stop axial movement of a cable; and wherein the second end stop is incorporated into a single conductor cable adapter comprising a centreline offset from a centreline of the cable.

23. The system according to claim 22, wherein the single conductor cable adapter comprises a conical inner surface, the centreline of which is offset from the centreline of the retainer.

* * * * *